United States Patent [19]
Yamamoto et al.

[11] Patent Number: 5,018,839
[45] Date of Patent: May 28, 1991

[54] LIQUID CRYSTAL DISPLAY DEVICE

[75] Inventors: Tomiaki Yamamoto, Chigasaki; Akio Murayama, Kamakura; Susumu Kondo, Yokosuka; Hitoshi Hato, Yokohama; Shinichi Kamagami, Yokohama; Shoichi Matsumoto, Yokohama, all of Japan

[73] Assignee: Kabushiki Kaisha Toshiba, Kawasaki, Japan

[21] Appl. No.: 385,535

[22] Filed: Jul. 26, 1989

[30] Foreign Application Priority Data

Jul. 27, 1988 [JP] Japan ................... 63-185503

[51] Int. Cl.$^5$ ............................................. G02F 1/135
[52] U.S. Cl. ............................. 350/347 R; 350/347 E; 350/339 R; 350/337
[58] Field of Search ................. 350/347 R, 347E, 337, 350/339 R, 334, 335

[56] References Cited

U.S. PATENT DOCUMENTS

| | | | |
|---|---|---|---|
| 4,239,349 | 12/1980 | Scheffer | 350/337 |
| 4,653,861 | 3/1987 | Kando et al. | 350/337 |
| 4,759,612 | 7/1988 | Nakatsuka et al. | 350/337 |
| 4,852,976 | 8/1989 | Suzuki | 350/337 |
| 4,909,606 | 3/1990 | Wada et al. | 350/347 R |

FOREIGN PATENT DOCUMENTS

| | | | |
|---|---|---|---|
| 0312297 | 4/1989 | European Pat. Off. | 350/337 |
| 0341702 | 11/1989 | European Pat. Off. | 350/347 R |
| 0193125 | 8/1986 | Japan | 350/337 |
| 0274924 | 11/1988 | Japan | 350/347 R |

OTHER PUBLICATIONS

New Multicolor Liquid Crystal Displays that use a Twisted Nematic Electro Optical cell, A. Terry, J. Scheffer, J. Appl. Phys., vol. 44, Nov. 73.
JJAP (Japanese Journal of Applied Physics) vol. 26, No. 11, Nov. 1987 pp. L1774–L1786, "Application of Retardation Compensation; A New . . ." Katoh et al.

Primary Examiner—Rolf Hille
Assistant Examiner—Tan Ho
Attorney, Agent, or Firm—Cushman, Darby & Cushman

[57] ABSTRACT

A liquid crystal display device has a liquid crystal cell including first and second substrates spatially arranged to oppose each other, first and second electrodes formed on opposing surfaces of the first and second substrates, respectively, and a liquid crystal composition filled between the first and second substrates and arranged in a twisted mode. First and second polarizers are arranged on both sides of the liquid crystal cell. An optical retardation film is arranged between the first substrate and the first polarizer. The optical retardation film has a retardation value falling within a range of $RO \times 0.55$ to $RO \times 0.80$ where $RO$ is a retardation of the liquid crystal cell. An optical axis of the optical retardation film is angled 100° to 130° with respect to the alignment direction of the liquid crystal molecules on the first substrate.

2 Claims, 7 Drawing Sheets

(PRIOR ART)

FIG. 1A

(PRIOR ART)

FIG. 1B

(PRIOR ART)

F I G. 2A

(PRIOR ART)

LIQUID CRYSTAL DISPLAY DEVICE

BACKGROUND OF THE INVENTION

1. Field of the Invention

The present invention relates to a liquid crystal display device and, more particularly, to a liquid crystal display device in which displays are achromatic.

2. Description of the Related Art

Recently, ST (supertwisted) or SBE (supertwisted birefringence effect) type liquid crystal display devices have been developed, which exhibit a sharp change of the transmitted light in response to the voltage change and a large contrast ratio even when driven with a large number of scanning lines, and have a wide viewing angle. The display device is disclosed in, for example, Japanese Unexamined Publication (Kokai) No. 60-10702, and is of a birefringence-controlled type in which a twist angle of the liquid crystal molecules are made as large as 180° to 270° as compared to TN liquid crystal devices.

Figure 1A:
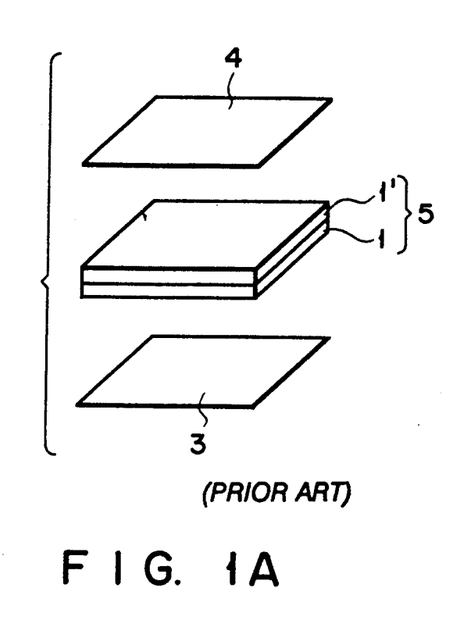
FIGS. 1A and 1B are views for explaining a conventional birefringence effect type liquid crystal display device.
Figure 1B:
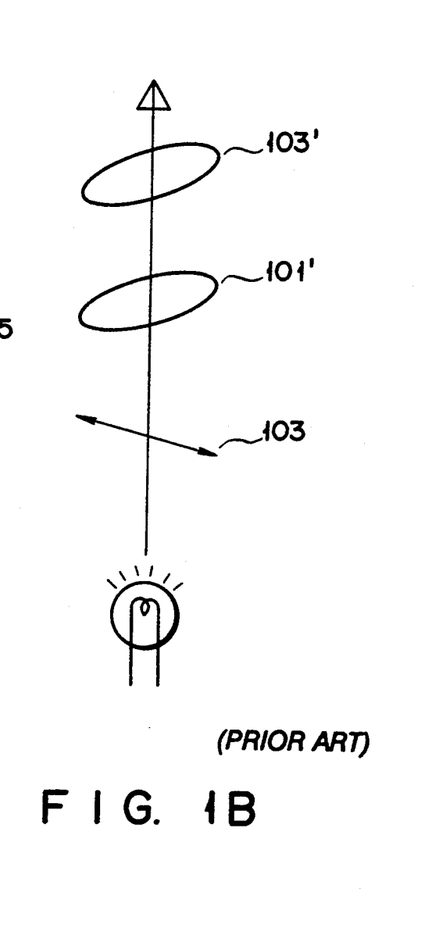

FIGS. 1A and 1B are views for explaining a principle of a conventional SBE or ST liquid crystal display device which performs a display based on a birefringence effect. Referring to these figures, the display device includes a liquid crystal cell 5 constituted by first and second substrates 1 and 1' and a liquid crystal composition (not shown) sealed therebetween. On both sides of the cell 5, polarizers 3 and 4 are arranged. Linearly polarized light 103 transmitted through the polarizer 3 is transmitted through the liquid crystal cell 5 and thereby generally becomes elliptically polarized light 101'. At this time, the shape of an ellipse depends on a twist angle $\Psi$ of the liquid crystal molecules in the cell 5, a retardation value RO defined by an equation $\Delta n \cdot d \cdot \cos^2\theta$ (where $\Delta n$ is an optical anisotropy of the liquid crystal composition, d is the cell thickness (substrate spacing), and $\theta$ is the tilt angel of the liquid crystal molecules), and a wavelength $\lambda$. The elliptically polarized light transmitted through the liquid crystal cell 5 is transmitted through the second polarizer 4 arranged at a predetermined angle, and is sensed by a human eye. In general, the shape of the ellipse changes in accordance with the wavelength, and the transmittances of the light are different per wavelength. Therefore, the transmitted light becomes chromatic. When a voltage is applied to the liquid crystal cell, alignment of the liquid crystal molecules changes and the optical anisotropy $\Delta n$ effectively changes. Thus, the retardation value RO and the transmission of the light change accordingly. A liquid crystal display is performed by using such a principle.

The above-mentioned display devices can be classified into a yellow mode type and a blue mode type, depending on a manner in which the polarizers are arranged. In the yellow mode display device, a bright yellow display is obtained in a non-selected state, and a black display is obtained in a selected state. In the blue mode display device, a deep blue display is obtained in a non-selected state, and white display is obtained in a selected state.

In any of the above conventional liquid crystal display devices, the display is not achromatic. Therefore, a readability evaluation differs in accordance with a visual sense of an observer, i.e., some observers evaluated that readability (e.g., a contrast) was degraded due to the background color. Further, since the display is chromatic, a color display can not be obtained by using a color filter as in a TN liquid crystal devices.

A technique to render the display achromatic is proposed in, for example, JJAP (26, NOV. 11. L177 84 (1987)). This discloses a two-layer-cell liquid crystal device using two liquid crystal cells. The two cells are provided such that the directions of twist of their liquid crystal molecules are reverse, the twist angles of their liquid crystal molecules are the same, and their retardations RO ($= \Delta n \cdot d \cdot \cos^2\theta$, where $\theta n$ is the optical anisotropy of the liquid crystals, d is the substrate spacing, and $\theta$ is the tilt angle of the liquid crystal molecules) are substantially the same.

Figure 2A:
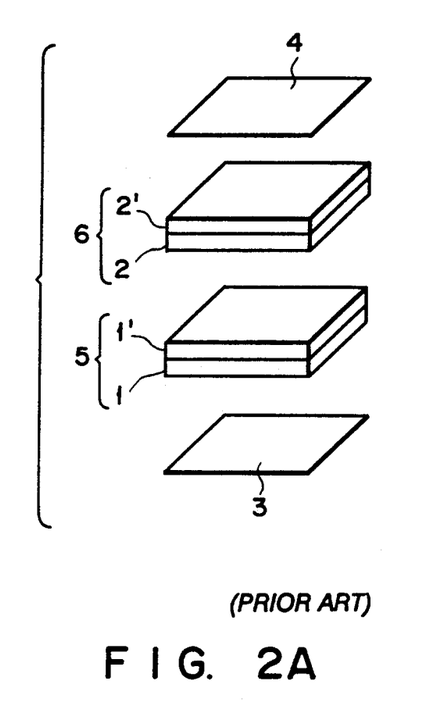
FIGS. 2A and 2B are views for explaining a conventional two-cell liquid crystal display device.
Figure 2B:
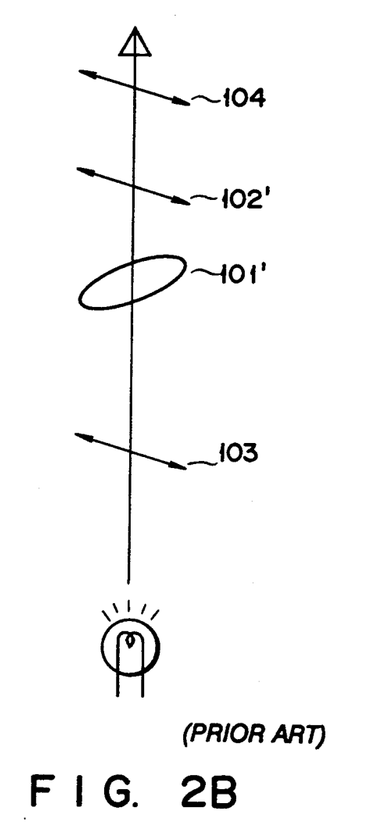

This two-layer-cell liquid crystal display device is constructed as shown in FIGS. 2A and 2B. Linearly polarized light 103 transmitted through the polarizer 3 is transmitted through the liquid crystal cell 5 to become an elliptically polarized light 101'. This elliptically polarized light is transmitted through the second cell 6 to become linearly polarized light 102', which is transmitted through the second polarizer 4, and then sensed by a human eye. In this way, the first and second liquid crystal cells 5 and 6 are optically complement each other. Thus, wavelength-dependence of the shape of ellipse transmitted through the first liquid crystal cell 5 becomes complementary with wavelength-dependence of the shape of the ellipse transmitted through the second cell 6. As a result, the light transmitted through the first and second cells 5 and 6 does not have wavelength-dependence, and achromatic display can be obtained. In this case, since the first and second liquid crystal cells must be complement each other, an error between the retardation values of the liquid crystal cells is required to fall within the range of $\pm 0.05$ $\mu$m.

As described above, the two-layer liquid crystal cell liquid crystal display device has advantages in that a b/w display can be obtained and the number of scanning lines can be increased. However, the two-cell liquid crystal device is thick and heavy because two liquid crystal cells are used. Further, the use of the two cells results in very high expenses, when yield is also considered.

SUMMARY OF THE INVENTION

It is, therefore, an object of the present invention to provide a liquid crystal display device having a liquid crystal display with a bright, achromatic background, a large contrast ratio, and a wide viewing angle, which is thin and small in weight and can fabricated at low cost.

The above object of the present invention is achieved by a liquid crystal display device comprising:

(A) a liquid crystal cell including:
  (a) first and second substrates spatially arranged to oppose each other,
  (b) first and second electrodes formed on opposing surfaces of said first and second substrates, respectively, and
  (c) a liquid crystal composition filled between said first and second substrates and arranged in a twisted mode;
(B) first and second polarizers arranged on both sides of said liquid crystal cell; and
(C) an optical retardation film arranged between said first substrate and said first polarizer;

wherein said optical retardation film has a retardation value falling within a range of RO×0.55 to RO×0.80 (where RO is a retardation of the liquid crystal cell), and an optical axis of said optical retardation film is angled 100° to 130° with respect to the alignment direction of the liquid crystal molecules contacting said, second substrate.

DETAILED DESCRIPTION OF THE PREFERRED EMBODIMENTS

The present invention will now be described in detail with reference to the accompanying drawings. Throughout the drawings, the same numerical references denote the same parts or portions.

Figure 3:
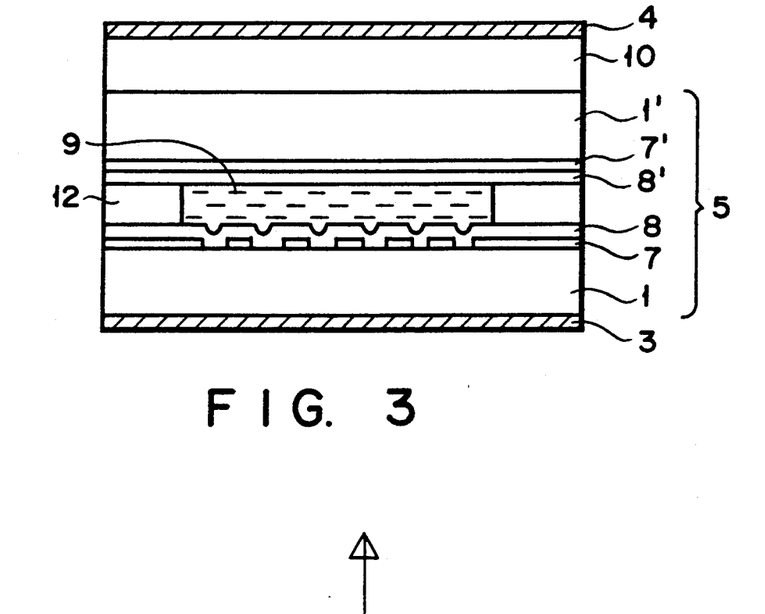
FIG. 3 shows a liquid crystal display device according to an embodiment of the present invention.

FIG. 3 is a sectional view showing a liquid crystal display device according to one embodiment of the present invention. Referring to FIG. 3, the liquid crystal display device includes a liquid crystal cell 5 comprising first and second transparent substrates 1 and 1' opposedly and spatially arranged substantially parallel to each other, and a liquid crystal composition filled therebetween. On the opposing surfaces of the substrates 1 and 1' transparent electrodes 7 and 7' formed of, for example, ITO (indium tin oxide) are formed, respectively. On the electrodes, alignment films 8 and 8' formed of, for example, polyimide or SiO are provided, respectively. The alignment films 8 and 8' adjust the tilt angles of the liquid crystal molecules with respect to the substrates 1 and 1', respectively. The liquid crystal composition 9 can be nematic liquid crystals such as cyclohexane-based, ester-based and a pyrimidine-based liquid crystal compositions, including those available from Merck & Co. and Hoffman Larosch Co. The liquid crystal cell 5 is sealed with a sealing agent 12 such as an epoxy adhesive.

On the outer surface of the substrate 1, a first polarizer 3 is provided. On the outer surface of the substrate 1', an optical retardation film 10 comprising a stretched organic film such as polyvinyl alcohol is arranged, on which a second polarizer 4 is provided.

Figure 4A:
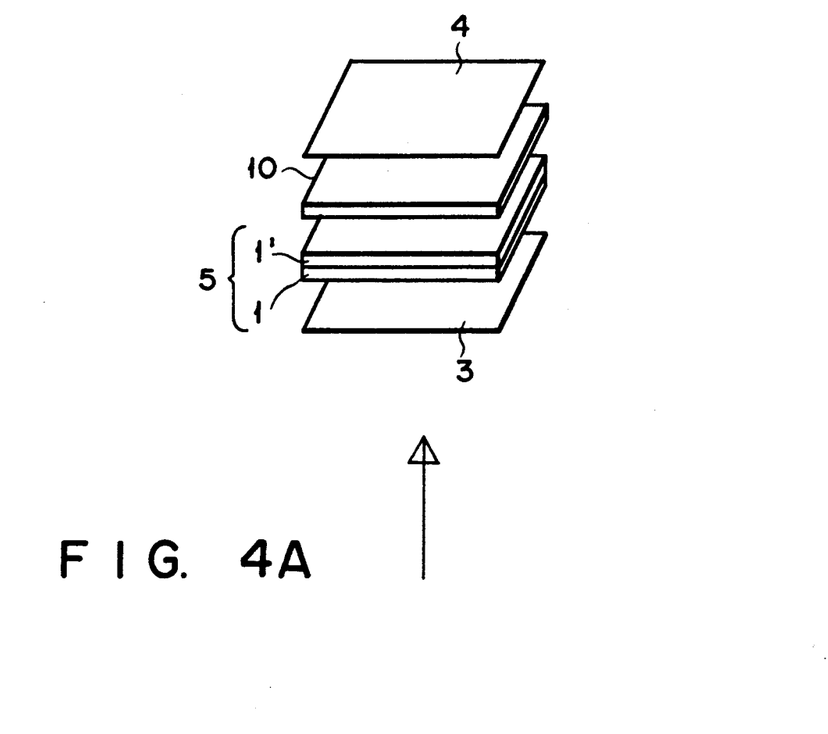
FIGS. 4A and 4B are views showing a relationship between an alignment direction, a direction of an absorbing axis of a polarizer, and an optical axis direction of an optical retardation film in the liquid crystal display device according to the embodiment of the present invention.
Figure 4B:
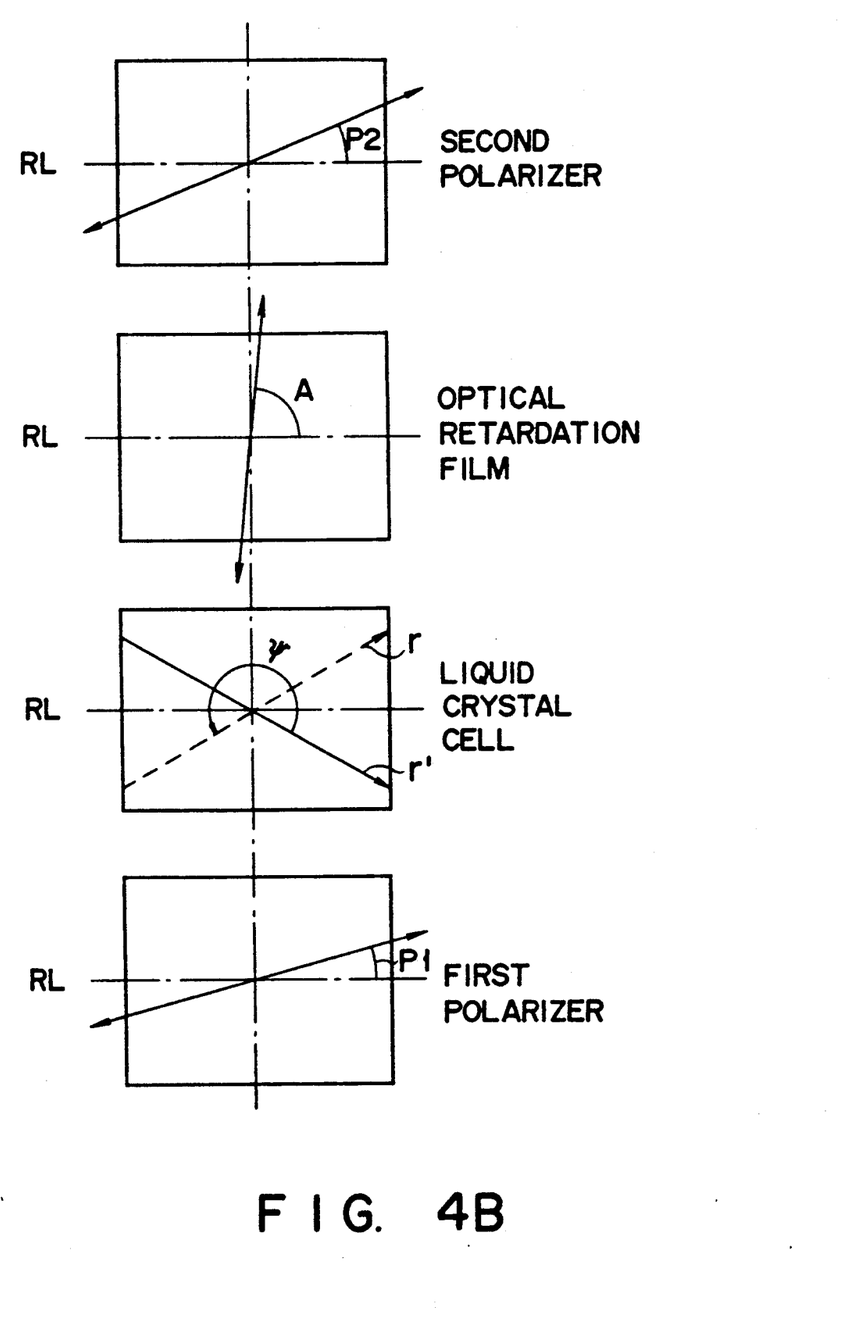

Referring also to FIGS. 4A and 4B, the liquid crystal molecules in the composition 9 is twisted counterclockwise from the substrate 1' toward the substrate 1 by an alignment direction r of the substrate 1 and an alignment direction r' of substrate 1', with a twist angel Ψ. In this case, the longer axes of the liquid crystal molecules on the substrates 1 and 1' are aligned along the directions r and r', respectively. In FIG. 4B, the line RL is the common reference line. The first and second polarizers 3 and 4 have absorption axes angled with angles P1 and P2 with respect to the line RL, respectively. The optical retardation film 10 has an optical axis (in the direction of stretch of the optical retardation film) angled with an angle A with respect to the line RL.

Figure 5A:
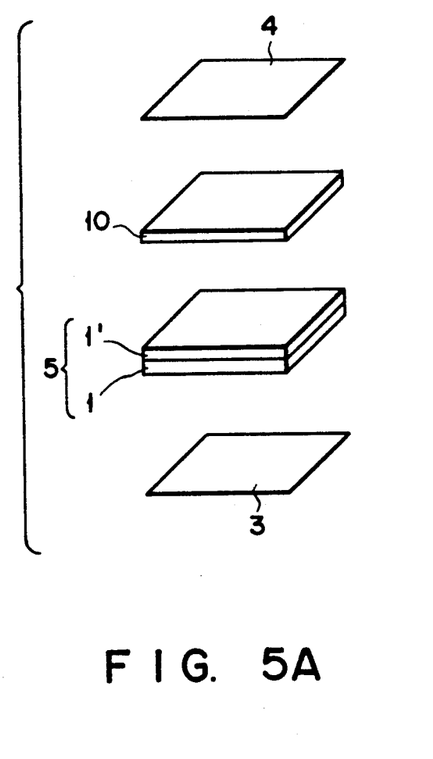
FIGS. 5A and 5B are views for explaining the functions of the liquid crystal display device according to the present invention.
Figure 5B:
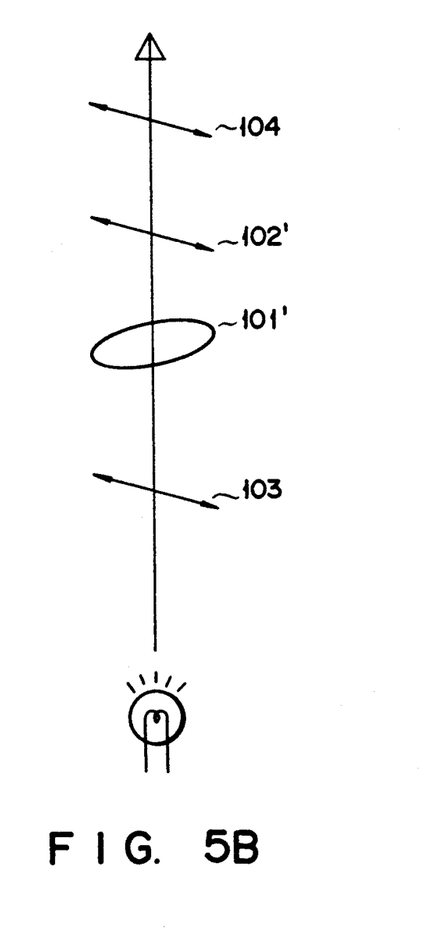

Referring particularly to FIGS. 5A and 5B, linearly polarized light 103 transmitted through the polarizer 3 is transmitted through the liquid crystal cell 5 to become generally elliptically polarized light 101'. The light 101' is transmitted through the optical retardation film 10 to become substantially linearly polarized light 102'. Finally, the light 102' is transmitted through the second polarizer 4 and sensed by a human eye.

In this case, a method of obtaining the linearly polarized light or elliptically polarized light 102' close to substantially linearly polarized light is important. According to studies made by the present inventors, it has been found that a good b/w display (achromatic display) can be realized by using an optical retardation film having a retardation value of $RO \times 0.55$ to $RO \times 0.80$ (where RO is the retardation of the liquid crystal cell) and arranging the optical retardation film 10 such that the optical axis of the film 10 is angled 100° to 130° with respect to the alignment direction r' of the liquid crystal molecules on the surface of the substrate 1' contacting the optical retardation film 10.

Figure 6:
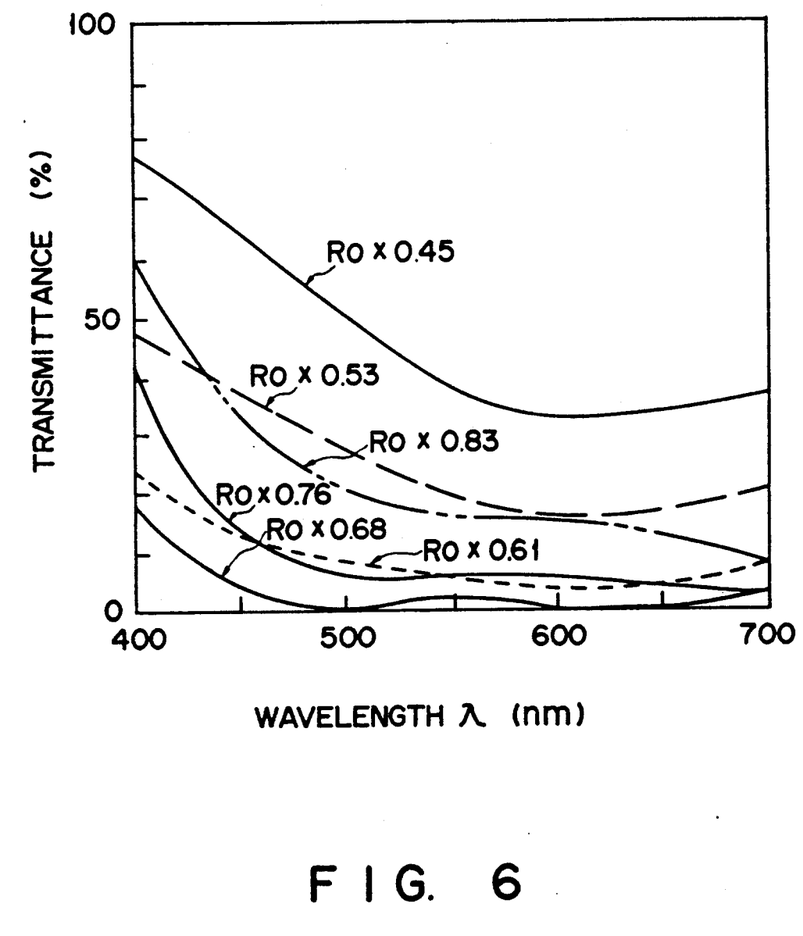
FIG. 6 is a graph showing wavelength-dependence of the transmittance of light when various optical retardation films having different retardation values are used.

FIG. 6 shows wavelength-dependency of the transmitted light at no application of voltage in liquid crystal display devices having the structure of FIG. 3 with optical retardation films of different retardation values. In this case, the optical anisotropy $\Delta n$ of the liquid crystal composition was 0.100, the liquid cell thickness (substrate spacing) was about 6.6 μm, and the retardation RO of the liquid crystal composition was about 0.66 μm in all devices used.

As seen from FIG. 6, coloring is generated, and achromatic display can not be obtained, when the retardation value of the optical retardation film is less than $RO \times 0.53$, or exceeds $RO \times 0.83$. Therefore, an optical retardation film having a retardation value falling within a range of $RO \times 0.55$ to $RO \times 0.80$ should most preferably be used in realizing achromatic display without coloring. Incidentally, the retardation RO of the liquid crystal cell can be set at 0.5 to 1.0 μm. The wavelength-dependencies of the transmitted lights were similar for the optical retardation films having retardation values within the above range.

The optical axis of the optical retardation film 10 used in the present invention should desirably be angled 100° to 130° with respect to the alignment direction r' of the liquid crystal molecules on the surface of the substrate 1' contacting the optical retardation film 10. Outside this range, coloring of the transmitted light occurs and/or the contrast ratio lowers, resulting in poor readability.

The twist angle of the liquid crystal molecules is preferably large in order to make the alignment angle of the liquid crystal molecules to rapidly change in response to the applied voltage, and is desirably 180° to 270°. Further, the optical retardation film 10 can function also as the substrate 1' and the substrate 1' need not be separately provided.

EXAMPLE 1

A liquid crystal display device of the structure shown in FIG. 3 was fabricated. The liquid crystal molecules were counterclockwise twisted with a twist angle Ψ of 240° from the substrate 1' toward the substrate 1 by the alignment direction r of the substrate 1 and the alignment direction r' of the substrate 1'. The tilt angle was 1.5°, and the cell thickness (substrate spacing) was 6.6 μm. At this time, the longer axes of the liquid crystal molecules on the substrates 1 and 1' were aligned along the directions r and r', respectively. The liquid crystal molecules on the surface of the substrate 1' had the optical axis angled—30° with respect to the line RL.

A liquid crystal composition prepared by adding S-811 (E. MERK Co.) as a counterclockwise chiral agent to ZLI-1577 (E. MERK Co.) was filled as the liquid crystal composition 9. An optical anisotropy Δn of this liquid crystal composition was 0.096, and the retardation value RO ($\Delta n \cdot d \cdot \cos^2 \theta$) was therefore about 0.63 μm.

The optical retardation film 10 consisting of a stretched polyvinyl alcohol was arranged on the substrate 1' such that its optical axis (stretched direction) was angled at A=85°, i.e., 115° with respect to the rubbing direction of the substrate 1'. The retardation value R of the optical retardation film 10 was 0.46 μm. The polarizers 3 and 4 were arranged such that their absorption axes were set at P1=14°, and P2=23°, respectively.

Figure 7:
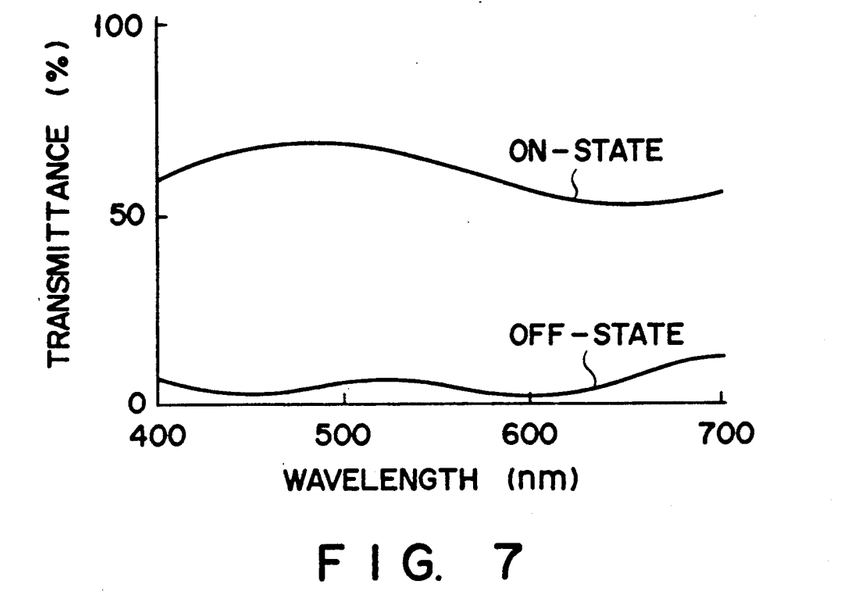
FIG. 7 is a graph showing wavelength-dependence of the transmittance of light in the liquid crystal display device according to the present invention.

The wavelength-dependency of the transmittance of the light when this liquid crystal cell 5 was applied with a voltage to turn-on and turn-off the liquid crystal cell 5 is shown in FIG. 7. As seen from the figure, the transmittance in both on- and off-state was substantially flat independent of the waveform, and achromatic display was obtained. Further, when the cell was multiplex-driven at a 1/200 duty, a contrast ratio was as high as about 7:1, and a viewing angle was large.

EXAMPLE 2

A liquid crystal cell was fabricated following the same procedures as in Example 1 except that the optical axis of the retardation film 10 was set at A=84°, i.e., 114° with respect to the rubbing direction of the substrate 1', and the absorption axes of the polarizers 3 and 4 were set at P1=93°, and P2=115°, respectively. When the cell was driven as in Example 1, achromatic display could be obtained, a contrast ratio was as high as about 8:1, and a viewing angle was large.

Control 1

Figure 8:
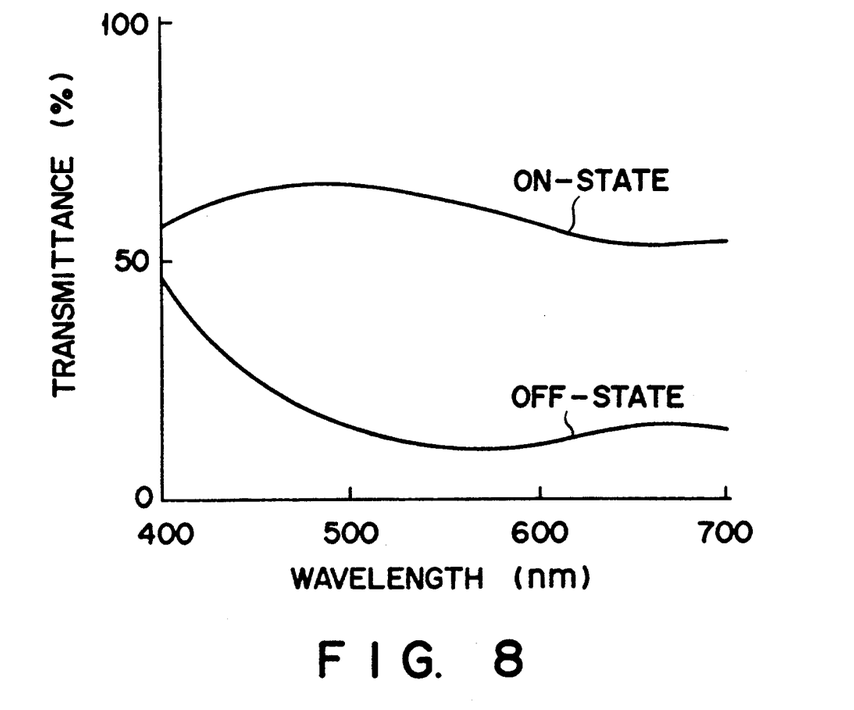
FIG. 8 is a graph showing wavelength-dependence of the transmittance of light in the liquid crystal display device of the comparative example.

A liquid crystal cell was fabricated following the same procedures as in Example 1 except that the retardation value of the optical retardation film was 0.32 μm. The wavelength-dependency of the transmittance of the light when this liquid crystal cell was applied with a voltage to turn-on and turn-off the liquid crystal cell is shown in FIG. 8. As seen from the figure, the wavelength-dependency of the transmittance of light was large in off-state. The device did not perform achromatic display; white display was obtained in onstate, but blue display was obtained in off-state.

Control 2

A liquid crystal display device was fabricated following the same procedures as in Example 1 except the optical retardation film had a retardation value of 0.52 μm. This display device had a large wavelength-dependency of transmittance of light in the off-state, and could not perform a display of large contrast ratio. That is, although a white display was obtained in the on-state, a gray display was obtained in the off-state, and the contrast ratio was as small as 3:1.

Control 3

A liquid crystal display device was fabricated following the same procedures as in Example 1 except that the optical axis of the optical retardation film 10 was set at A=110°, i.e., 140° with respect to the rubbing direction of the substrate 1', and the polarizers 3 and 4 were set at P1=14° and P=23°, respectively. When this device was driven as in Example 1, a white display was obtained in the on-state, and a gray display was obtained in the off-state, failing to perform achromatic display.

Control 4

A liquid crystal display device was fabricated following the same procedures as in Example 1 except that the optical axis of the optical retardation film 10 was set at A=60°, i.e., 90° with respect to the rubbing direction of the substrate 1', and the polarizers 3 and 4 were set at P1=14° and P2=23°, respectively. When this device was driven as in Example 1, a blue display was obtained in the on-state, and a gray display was obtained in the off-state, failing to perform achromatic display.

As described above, according to the present invention, an inexpensive liquid crystal display device is provided which performs an achromatic display and exhibits a large contrast ratio and has a wide viewing angle.

What is claimed is:
1. A liquid crystal display device comprising:
   (A) a liquid crystal cell including:
      (a) first and second substrate spatially arranged to oppose each other,
      (b) first and second electrodes arranged on opposing surfaces of said first and second substrates, respectively, and
      (c) a liquid crystal composition filled between said first and second substrates and arranged in a twisted mode, an angle of twisting being in the range from 180° to 270°;
   (B) first and second polarizers arranged on both sides of said liquid crystal cell; and
   (C) an optical retardation film arranged between said second substrate and said second polarizer;
   wherein said optical retardation film has a retardation value falling within a range of RO×0.55 to RO×0.80 (where RO is a retardation of the liquid crystal cell "and falls within a range of 0.5 to 1.0 μm"), and an optical axis of said optical retardation film is angled 100° to 130° with respect to the alignment direction of the liquid crystal molecules on said second substrate.
2. The device according to claim 1, wherein said optical retardation film functions also as said second substrate.

* * * * *